April 18, 1967 R. J. NORDHAUS ET AL 3,314,088
WATER RESPONSIVE RELEASE MECHANISM
Filed Dec. 21, 1965
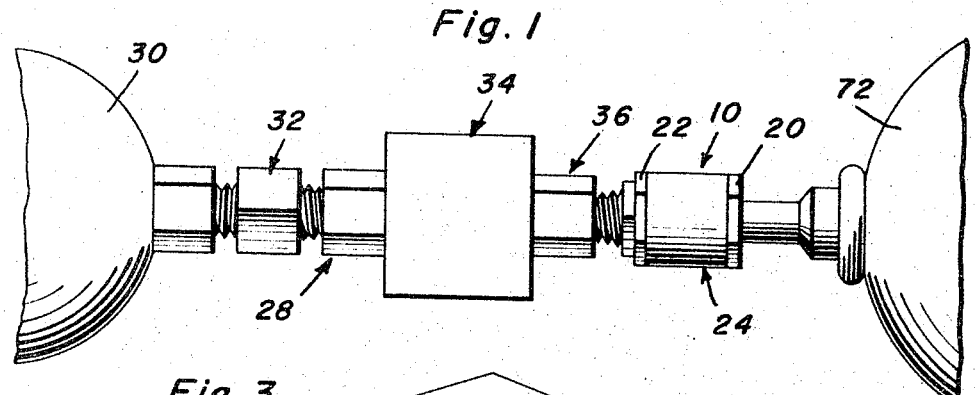
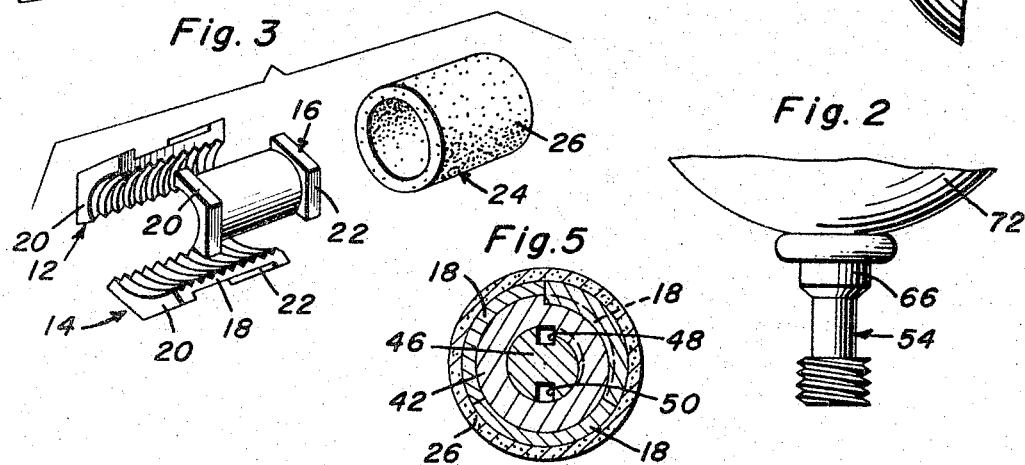
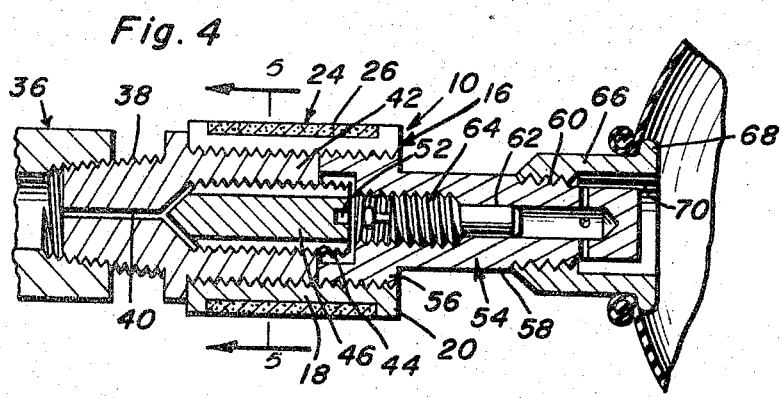
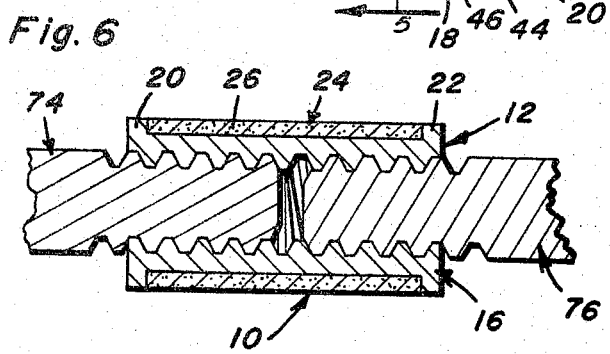
Robert J. Nordhaus
Harold W. Groves
Robert E. Marsh
INVENTORS

United States Patent Office 3,314,088
Patented Apr. 18, 1967

3,314,088
WATER RESPONSIVE RELEASE MECHANISM
Robert J. Nordhaus, 6900 Rio Grande Blvd. NW. 87107; Harold W. Groves, 1821 General Somervell St. NE. 87112; and Robert E. Marsh, 1105 Childers NE. 87112, all of Albuquerque, N. Mex.
Filed Dec. 21, 1965, Ser. No. 515,427
5 Claims. (Cl. 9—9)

This invention relates generally to water responsive release mechanisms, and more specifically to a novel sleeve and split nut connecting means which provides a structurally secure connection while dry, and when wet releases to perform various functions, such as for use in an automatically releasable signal device for lifesaving equipment.

It is an object of the present invention to provide means for maintaining a positive mechanical lock between two parts which is automatically releasable at a predetermined rate upon contact with a fluid such as water or the like.

It is another object of the present invention to provide connecting means which retains its structural integrity while dry and completely loses its structural integrity when wet.

It is a further object of the present invention to provide a lifesaving balloon-type location indicating device utilizing the water-responsive release mechanism of the present invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial elevational view of the location indicating device utilizing the water responsive release mechanism comprising the present invention;

FIGURE 2 is a partial elevational view of the balloon and valve portion of the indicating device illustrated in FIGURE 1;

FIGURE 3 is an exploded perspective view of the water responsive release mechanism comprising the present invention;

FIGURE 4 is an enlarged vertical sectional view of a portion of the indicating device illustrated in FIGURE 1;

FIGURE 5 is a vertical sectional view taken substantially on the plane of the line 5—5 of FIGURE 4; and FIGURE 6 is a vertical sectional view illustrating a generalized use of the water responsive release mechanism comprising the present invention.

Referring now to the drawings with more particularity, and especially to FIGURES 1 through 5, reference numeral 10 generally denotes the water responsive release mechanism comprising the present invention. The release mechanism 10 comprises three split collar members 12, 14 and 16, each being identical in construction and including an internally threaded body member 18 with outwardly flanged ends 20 and 22. The internally threaded portions of the three split collar members will mate when the split collar members are joined together, and thus when the split collar members are so joined, a unitary internally threaded collar for receiving and connecting externally connected ends of two mechanisms is formed. Of course, it will be appreciated that any number of split collars may be utilized, as for example only two or as many as four or more, and that the split collars do not necessarily have to be in the precise shape or configuration as illustrated in FIGURE 3. A sleeve member generally denoted by reference numeral 24 comprising a water soluble hollow cylindrical member 26 which may be constructed of polyvinyl alcohol, Radel, or other suitable material also comprises a portion of the water responsive release mechanism, and as illustrated in FIGURES 1, 4 and 5, will normally be mounted over the split collar members 12, 14 and 16 in order to retain them in unitary condition. Thus, it will be appreciated that the water responsive release mechanism 10 will provide a positive mechanical lock between two parts that may be threaded into the unitary collar formed by the split collar members 12, 14 and 16, and due to the water solubility of the sleeve member 24, will release automatically upon contact with fluid such as water. Of course, it will be appreciated that the time of dissolution of the sleeve member 24 will depend upon the specific type of material used, as well as the thickness of the sleeve.

Referring now more specifically to FIGURE 1, reference numeral 28 is used to generally denote the balloon-type location indicating device utilizing the water responsive release mechanism 10 as an important part thereof. The indicating device 28 includes a helium container 30 which is threadedly connected by suitable connectors 32 to a water activated valve generally denoted by reference numeral 34, any number of which are well known to those skilled in the art. One such valve is illustrated in the patent to J. F. Novak, No. 2,964,050, Dec. 13, 1960. This valve or similar water activated valve may be utilized with the instant invention. Also comprising a portion of the indicating device 28 is the water responsive release mechanism 10 specifically described above. Thus, by referring to FIGURE 4 in particular, it will be observed that the water activated valve 34 is connected by suitable connector 26 to a second connector 38 having the gas passageway 40 therein, the connector 38 in turn including the threaded end portion 42 which is threaded into the water responsive release mechanism 10. The threaded end portion 42 has an internally threaded portion 44 in which is threadedly received a flow rate control valve 46 which comprises a slotted throttle screw having the two slots 48 and 50 therein for communicating with the passageway 40 in order to direct the helium gas at a predetermined rate through the release mechanism 10. Further, it will be seen that the throttle screw 46 has a slotted end 52 whereby it may be turned in order to control the rate of flow of the gas therethrough as the slots 48 and 50 are moved with respect to the passageway 40.

Also threadedly received in the water responsive release mechanism 10 is a valve mounting member generally denoted by reference numeral 54 which includes an externally threaded end portion 56 and a body portion 58 having an externally threaded end 60 thereon. Mounted within an axially extending bore 62 in the member 54 is a conventional Schrader valve 64 providing a check valve for the indicating device 28. Mounted on the threaded end 60 of the member 54 is a baffle 66 having the outwardly flared flange 68 on the end thereof surrounding an annular passageway 70. The baffle 66 is provided to prevent jetting, as for example when the helium gas 30 is directed through the various components of the indicating device 28 in response to immersion in water. Further, a balloon 72 is mounted on the baffle 66 about the flange 68 so as to be filled by the helium gas escaping from the container 30 and through the various components of the indicating device.

Thus, it will be readily apparent that the indicating device will operate in the following manner: the indicating device 28 will normally be mounted as a package on a life preserver or a belt. The balloon 72 is attached to the person by means of a line which is not illustrated. Upon contact with the water, the valve 34 will be activated immediately, and the helium from bottle or container 30 will be dumped through the mechanism thereby filling the balloon 72. At the same time, the water-soluble sleeve 24 will begin to dissolve. The helium dump takes place in a matter of seconds, while the structural integrity of the mechanism will be maintained for several minutes as the sleeve 24 is dissolving. Once the sleeve 24 is dissolved, however, the balloon will be free from the remainder of the indicating device, the helium being retained therein by means of the valve 64. Thus, the balloon will be free to elevate to the limit of the line by which it is attached to the person in order to be easily spotted by rescue aircraft or ships or the like.

Referring now to FIGURE 6, a generalized use of the water responsive release mechanism 10 is illustrated. The release mechanism 10 as illustrated includes the sleeve 24 of water soluble material comprising a generally hollow cylindrical member 26 which is retained about the split collar members 12, 14 and 16 between the flanges 20 and 22 in order to provide an internally threaded collar. Threadedly received in the collar are first and second mechanisms generally denoted by reference numerals 74 and 76, respectively. It will be appreciated that the mechanisms 74 and 76 are illustrated as merely being threaded members, but they may be any two mechanisms which are to be retained together by a normally structurally sound mechanical lock which is water soluble and thus releasable. It will be appreciated, of course, that the water responsive release mechanism 10 comprises releasable joining means for two mechanisms, which joining means is water soluble at a predetermined rate whereby immersion thereof in water will cause the sleeve 24 to dissolve, thereby releasing the subject mechanisms.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water resposnive coupling device for releasably coupling first and second mechanisms comprising, at least two split collar members, said split collar members each being internally threaded and when joined providing a unitary internally threaded collar for receiving and connecting externally threaded ends on first and second mechanisms, and means for releasably joining said split collar members whereby said first and second mechanisms will be connected thereby when threaded therein, said releasable joining means being fluid soluble at a predetermined rate whereby immersion of said coupling device in fluid will cause said releasable joining means to dissolve and release said split collar members.

2. The combination of claim 1 wherein said releasable joining means comprises a sleeve of generally hollow cylindrical nature adapted to be mounted about said split collar members.

3. The combination of claim 1 wherein said first mechanism comprises a gas filled container, said second mechanism comprises an inflatable member, means for causing the gas in said container to fill said inflatable member in response to immersion in fluid, said fluid responsive filling means being quicker acting than said releasable joining means whereby said inflatable member will be filled with gas prior to dissolution of said releasable joining means.

4. The combination of claim 3 wherein said releasable joining means comprises a generally hollow cylindrical sleeve, said split collar members having flanged end portions, said sleeve being fixedly retained about said split collar members between said flanged end portions.

5. The combination of claim 4 including three split collar members, said split collar members when cooperatively joined comprising a hollow cylindrical internally threaded collar, said sleeve member adapted to be mounted about said split collar members for providing a positive mechanical lock between said gas-filled container and said inflatable member, said positive mechanical lock retaining its structural integrity until such time as it is immersed in water.

References Cited by the Examiner
UNITED STATES PATENTS
3,139,032   6/1964   Silverstein _____ 102—49

MILTON BUCHLER, *Primary Examiner.*

A. H. FARRELL, *Assistant Examiner.*